US009516287B2

(12) United States Patent
Marumoto

(10) Patent No.: US 9,516,287 B2
(45) Date of Patent: Dec. 6, 2016

(54) IMAGING DEVICE, IMAGE READING DEVICE, IMAGE FORMING APPARATUS, AND METHOD OF DRIVING IMAGING DEVICE

(71) Applicant: Kohei Marumoto, Kanagawa (JP)

(72) Inventor: Kohei Marumoto, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 45 days.

(21) Appl. No.: 14/302,737

(22) Filed: Jun. 12, 2014

(65) Prior Publication Data
US 2015/0002708 A1 Jan. 1, 2015

(30) Foreign Application Priority Data
Jul. 1, 2013 (JP) ................................. 2013-138450

(51) Int. Cl.
*H04N 5/341* (2011.01)
*H04N 9/04* (2006.01)
*H04N 5/347* (2011.01)
*H04N 5/378* (2011.01)

(52) U.S. Cl.
CPC .............. *H04N 9/045* (2013.01); *H04N 5/347* (2013.01); *H04N 5/378* (2013.01)

(58) Field of Classification Search
None
See application file for complete search history.

(56) References Cited

U.S. PATENT DOCUMENTS

| | | | | |
|---|---|---|---|---|
| 4,882,686 A * | 11/1989 | Gretter | G06K 15/1247 | 346/33 R |
| 5,596,190 A * | 1/1997 | Li | H04N 1/028 | 250/236 |
| 5,943,141 A * | 8/1999 | Tamura | H04N 1/4076 | 358/461 |
| 5,963,344 A * | 10/1999 | Morita | H04N 5/335 | 348/E3.027 |
| 6,005,990 A * | 12/1999 | Barrett | H04N 1/195 | 358/483 |
| 6,018,357 A * | 1/2000 | Sawada | G06K 15/1247 | 347/237 |
| 7,449,666 B2 * | 11/2008 | Kaihotsu | G01J 3/02 | 250/205 |
| 7,529,003 B2 * | 5/2009 | Fukawa | H04N 1/484 | 358/505 |
| 7,535,606 B1 * | 5/2009 | Walton | H04N 1/02865 | 358/1.9 |
| 7,551,327 B2 * | 6/2009 | Chang | H04N 1/0473 | 358/471 |
| 7,656,563 B2 * | 2/2010 | Lee | H04N 1/02865 | 358/474 |
| 7,817,297 B2 * | 10/2010 | Ushida | H04N 1/191 | 358/1.16 |
| 7,884,978 B2 * | 2/2011 | Ikeno | H04N 1/02815 | 358/475 |
| 8,072,652 B2 * | 12/2011 | Yamada | H04N 1/00931 | 358/403 |
| 8,363,294 B2 * | 1/2013 | Kim | H04N 1/401 | 358/1.16 |
| 2003/0202225 A1 * | 10/2003 | Fukawa | H04N 1/193 | 358/506 |
| 2004/0017505 A1 * | 1/2004 | Yamauchi | H04N 1/02815 | 348/370 |
| 2004/0042807 A1 * | 3/2004 | Nakayama | G03G 15/5058 | 399/49 |
| 2004/0130553 A1 * | 7/2004 | Ushida | G06T 1/60 | 345/531 |

(Continued)

FOREIGN PATENT DOCUMENTS

JP 4004833 8/2007
JP 2010-220129 9/2010

*Primary Examiner* — Ted Barnes
(74) *Attorney, Agent, or Firm* — Oblon, McClelland, Maier & Neustadt, L.L.P.

(57) ABSTRACT

The present invention is concerning an imaging device comprising: a photoelectric conversion unit that generates imaging signals corresponding to imaging light received from an imaging object; a summation unit that performs summation of the imaging signals generated by the photoelectric conversion unit; a summation controller that controls the summation unit such that the summation unit performs, per line, an operation of summation of imaging signals acquired from the photoelectric conversion unit during the time period of one line for the number of plural times in periods that are twice as much as that of the spatial frequency of the imaging object or more; and a signal generator that generates and outputs an imaging signal of each line from plural sum outputs generated per line.

10 Claims, 12 Drawing Sheets

(56) References Cited

U.S. PATENT DOCUMENTS

| | | | |
|---|---|---|---|
| 2004/0130750 A1* | 7/2004 | Ushida | H04N 1/191 358/1.16 |
| 2005/0094225 A1* | 5/2005 | Hu | H04N 1/191 358/493 |
| 2006/0256120 A1* | 11/2006 | Ushida | G06T 1/60 345/531 |
| 2007/0013764 A1* | 1/2007 | Lee | H04N 1/4005 347/224 |
| 2007/0035634 A1* | 2/2007 | Edgar | G06T 11/001 348/222.1 |
| 2007/0057159 A1* | 3/2007 | Hing | G01N 21/31 250/214 R |
| 2008/0123152 A1* | 5/2008 | Goto | G06K 15/02 358/3.27 |
| 2008/0204297 A1* | 8/2008 | Mizuta | H03M 1/0607 341/155 |
| 2008/0204826 A1* | 8/2008 | Kimura | H04N 1/1938 358/497 |
| 2009/0161138 A1* | 6/2009 | Nakamura | H04N 1/484 358/1.13 |
| 2009/0161139 A1* | 6/2009 | Kagawa | H04N 1/02815 358/1.13 |
| 2009/0161182 A1* | 6/2009 | Yamada | H04N 1/484 358/505 |
| 2011/0006944 A1* | 1/2011 | Goldman | G01S 13/9029 342/25 A |
| 2011/0157255 A1* | 6/2011 | Hsu | G09G 3/342 345/690 |
| 2013/0057931 A1* | 3/2013 | Mayer | H04N 5/37213 358/494 |
| 2013/0170000 A1* | 7/2013 | Kurakata | H04N 1/04 358/461 |
| 2014/0204147 A1* | 7/2014 | Chen | H04N 1/504 347/19 |
| 2014/0218577 A1* | 8/2014 | Kanemitsu | H04N 5/35563 348/302 |

\* cited by examiner

IMAGING DEVICE, IMAGE READING DEVICE, IMAGE FORMING APPARATUS, AND METHOD OF DRIVING IMAGING DEVICE

CROSS-REFERENCE TO RELATED APPLICATIONS

The present application claims priority to and incorporates by reference the entire contents of Japanese Patent Application No. 2013-138450 filed in Japan on Jul. 1, 2013.

BACKGROUND OF THE INVENTION

1. Field of the Invention

The present invention relates to an imaging device, an image reading device, an image forming apparatus, and a method of driving an imaging device.

2. Description of the Related Art

An image reading device illuminates an original with light from a light source, such as an LED, and, with a photoelectric conversion element that is a CMOS image sensor, etc., receives the reflected light and performs photoelectric conversion, thereby generating an imaging signal that is an analog signal. LED is an abbreviation of "Light Emitting Diode" and CMOS is an abbreviation of "Complementary Metal-Oxide Semiconductor". The image reading device digitizes the imaging signal by performing A/D conversion with an A/D converter, thereby generating imaging data.

When reading a color image at high speed, the image reading device uses a white light source as a light source and receives reflected light with corresponding photoelectric conversion elements via color filters of respective color components, such as R (red), G (green) and B (Blue). In this manner, the image reading device generates imaging signals of the respective color components with the respective photoelectric conversion elements and combines the imaging data of the respective color components after A/D conversion, thereby generating a color image.

When photoelectric conversion is performed for each color component, there is variation in sensitivity to the color components. This results from the use of a phosphor-based white LED where light of a blue LED and light from a fluorescent coating are mixed and from the fact that the color filters do not have ideal spectral characteristics. During manufacturing, variation is caused in the amount of the fluorescent coating of the light source to be applied and the film thickness of the color filters. Thus, the variation in sensitivity to the color components is different from one individual to another. The variation in sensitivity between color components causes a difference in used dynamic range of the A/D converter between color components, which causes a difference in image tone.

For a method of adjusting the sensitivity to each color component, is known a method of amplifying an imaging signal of before A/D conversion with an amplifier where the gain is adjusted for each color component so as to make the best use of the dynamic range of the A/D converter. However, with this method, noise components are amplified as well with the gain of the amplifier and thus the noise level differs between color components, which degrades the image quality.

For a method of adjusting the level of an imaging signal of each color component without adjusting the gain of an amplifier, is known a technology for adjusting the electric charging time according to the sensitivity ratio between color components during exposure of one frame with an area sensor or during exposure of one line with a line sensor.

Japanese Patent No. 4004833 discloses a method of driving a solid-state imaging element, which is a method aimed at adjusting the level of an imaging signal of each color component without adjusting the gain of an amplifier. This method of driving a solid-state imaging element performs an electronic shutter operation intermittently for plural times during the period of performing exposure once. Furthermore, electricity is stored selectively in a reading period correlative to the sensitivity ratio and an image signal is generated according to the stored electricity when the exposure period ends.

As for the conventional technology for adjusting the electric charging time for each color component, if there is a large difference in sensitivity to color components, the time of electric charging for a color to which the sensitivity is high in one line is shortened, which leads to uneven electric charging periods in one line. For example, a device that reads an original by scanning with a carriage, such as a scanner, has a problem in that, when the electric charging periods are uneven in one line, a fine line in the main-scanning direction (a fine line along the direction in which photoelectric conversion elements of one line are arrayed) disappears (cannot be read).

The method of driving a solid-state imaging element disclosed in Japanese Patent No. 4004833 has the same problem, i.e., the number of times of charging is small for a color component to which the sensitivity is high, which leads to uneven electric charging periods in one line. This causes an inconvenience in that, when an original is read by scanning with a carriage, the fine line in the main scanning direction disappears as described above.

In view of the abode-described inconvenience, there is a need to provide an imaging device, an image reading device, an image forming apparatus, and a method of driving an imaging device with each of which an original can be read with high reproducibility.

SUMMARY OF THE INVENTION

It is an object of the present invention to at least partially solve the problems in the conventional technology.

According to the present invention, there is provided an imaging device comprising: a photoelectric conversion unit that generates imaging signals corresponding to imaging light received from an imaging object; a summation unit that performs summation of the imaging signals generated by the photoelectric conversion unit; a summation controller that controls the summation unit such that the summation unit performs, per line, an operation of summation of imaging signals acquired from the photoelectric conversion unit during the time period of one line for the number of plural times in periods that are twice as much as that of the spatial frequency of the imaging object or more; and a signal generator that generates and outputs an imaging signal of each line from plural sum outputs generated per line.

The present invention also provides an image reading device comprising the above-mentioned imaging device.

The present invention also provides an image forming apparatus comprising the above-mentioned imaging device.

The present invention also provides a method of driving an imaging device including a photoelectric conversion unit, a summation unit, a summation controller, and a signal generator, the method of diving the imaging device comprising: generating, by the photoelectric conversion unit, imaging signals corresponding to imaging light received from an imaging object; performing, by the summation unit, summation of the imaging signals generated by the photoelectric conversion unit; controlling, by the summation controller, the summation unit such that the summation unit performs, per line, an operation of summation of imaging signals acquired from the photoelectric conversion unit during the time period of one line for the number of plural times in periods that are twice as much as that of the spatial frequency of the imaging object or more; and generating and outputting, by the signal generator, an imaging signal of each line from plural sum outputs that are generated per line.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an imaging device, an image reading device, an image forming apparatus, and a method of driving an imaging device will be described in detail below with reference to the accompanying drawings.

First Embodiment

Figure 1:
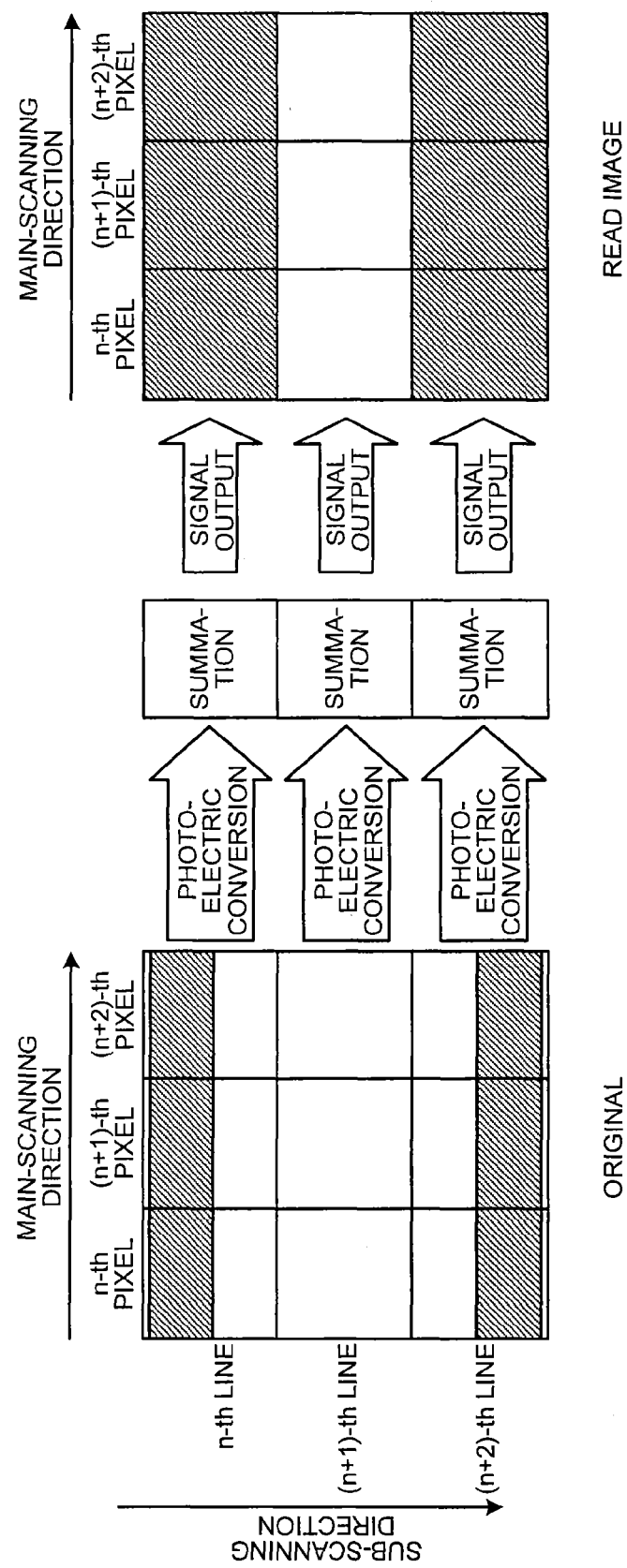
FIG. 1 is a diagram illustrating summation of imaging signals per line in an image reading device that is a comparative example.

FIG. 1 is a schematic diagram illustrating a reading operation performed by an image reading device that is a comparative example. The left diagram in FIG. 1 illustrates an original where fine lines (horizontal lines) are drawn along a n-th line and a (n+2)-th line along the main-scanning direction (n is a natural number). The central diagram in FIG. 1 illustrates summation of imaging signals per line. The right diagram in FIG. 1 illustrates an image (read image) corresponding to the imaging signals after summation.

The image reading device includes a line sensor in which pixels (imaging devices, i.e., photoelectric conversion elements) are arrayed along the main-scanning direction shown in the left diagram in FIG. 1. The image reading device reads an original by moving a carriage having such a line sensor in the sub-scanning direction shown in the left diagram in FIG. 1. The image reading device performs summation of imaging signals that are generated by performing photoelectric conversion with each imaging device in each time corresponding to one line as illustrated in the central diagram in FIG. 1. Accordingly, as illustrated in the right diagram in FIG. 1, a read image according to the sensitivity corresponding to one line of the line sensor can be obtained.

Figure 2:
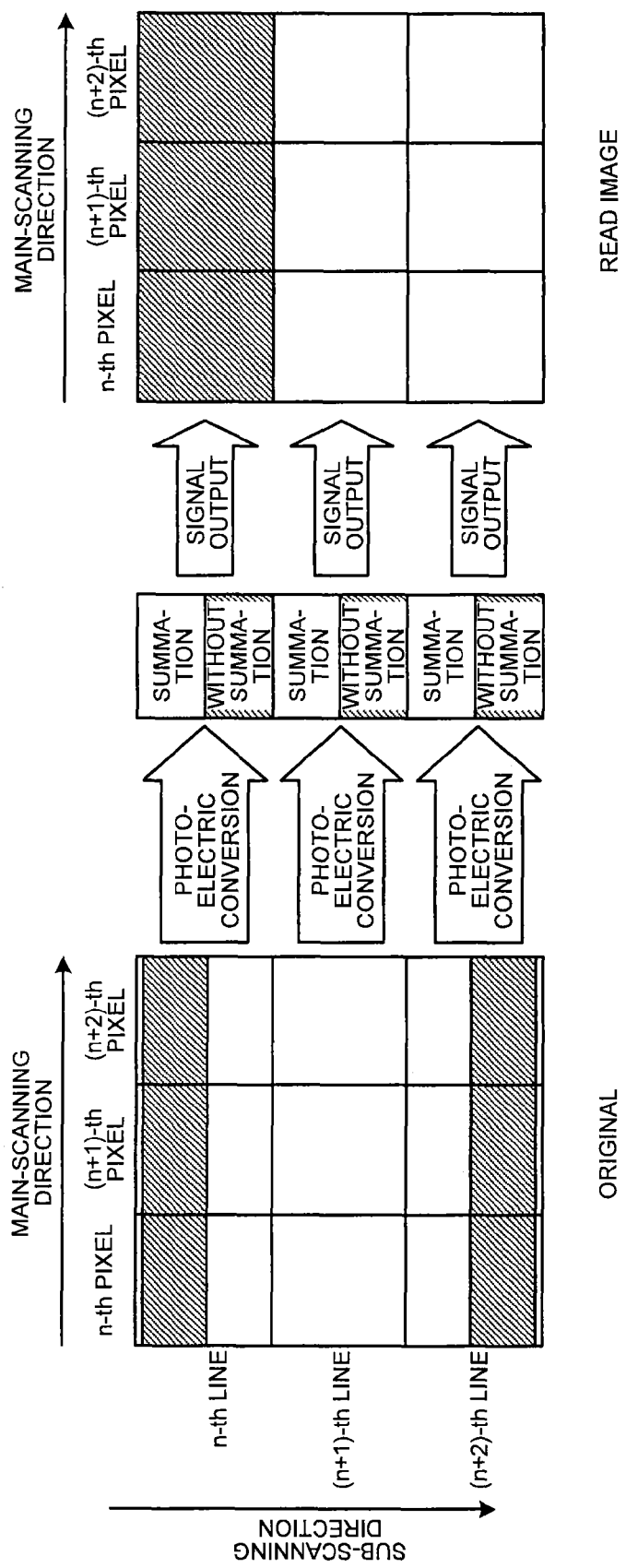
FIG. 2 is a diagram illustrating summation of imaging signals per line in the image reading device of the comparative example with lowered reading sensitivity.

The sensitivity of the image reading device can be adjusted by changing the time of summation of imaging signals. FIG. 2 is a schematic diagram illustrating a reading operation with lowered sensitivity performed by the image reading device that is the comparative example. FIG. 2 illustrates the reading operation with sensitivity that is lowered by changing the time of summation of imaging signals to a summation time corresponding to a half line. The left diagram in FIG. 2 illustrates an original where fine lines (horizontal lines) are drawn along the main-scanning direction in a n-th line and a (n+2)-th line (n is a natural number). The central diagram in FIG. 2 illustrates summation of imaging signals in the summation time corresponding to a half line. The right diagram in FIG. 2 illustrates an image (read image) corresponding to the imaging signals after summation.

With the sensitivity corresponding to the summation time corresponding to a half line, as illustrated in the central diagram in FIG. 2, summation is performed in the first half of the time corresponding to one line and summation is not performed in the last half of the time (without summation). Thus, the imaging signals corresponding to the horizontal line in the main-scanning direction drawn in the n-th line in the left diagram in FIG. 2 are summed in the above-described first half time. Accordingly, the horizontal line in the main-scanning direction drawn in the n-th line appears on the read image as depicted in the right diagram in FIG. 2.

However, the imaging signals corresponding to the horizontal line in the main-scanning direction drawn in the (n+2)-th line of the left diagram in FIG. 2 correspond to the last half time without summation. Thus, the horizontal line in the main-scanning direction drawn in the (n+2)-th line does not appear in the read image as depicted in the right diagram in FIG. 2 (image disappearance). For example, when an original in which an image with a high spatial frequency in the sub-scanning direction, such as a horizontal line or halftone dots that are drawn in the main-scanning direction, is read, moire of frequency components that do not exist originally may occur in the sub-scanning direction.

Under such circumstances, the image reading device of the first embodiment performs summation in a certain time period for the number of plural times at equal intervals during the reading time per line, which prevents occurrence of image disappearance and occurrence of moire.

Figure 3:
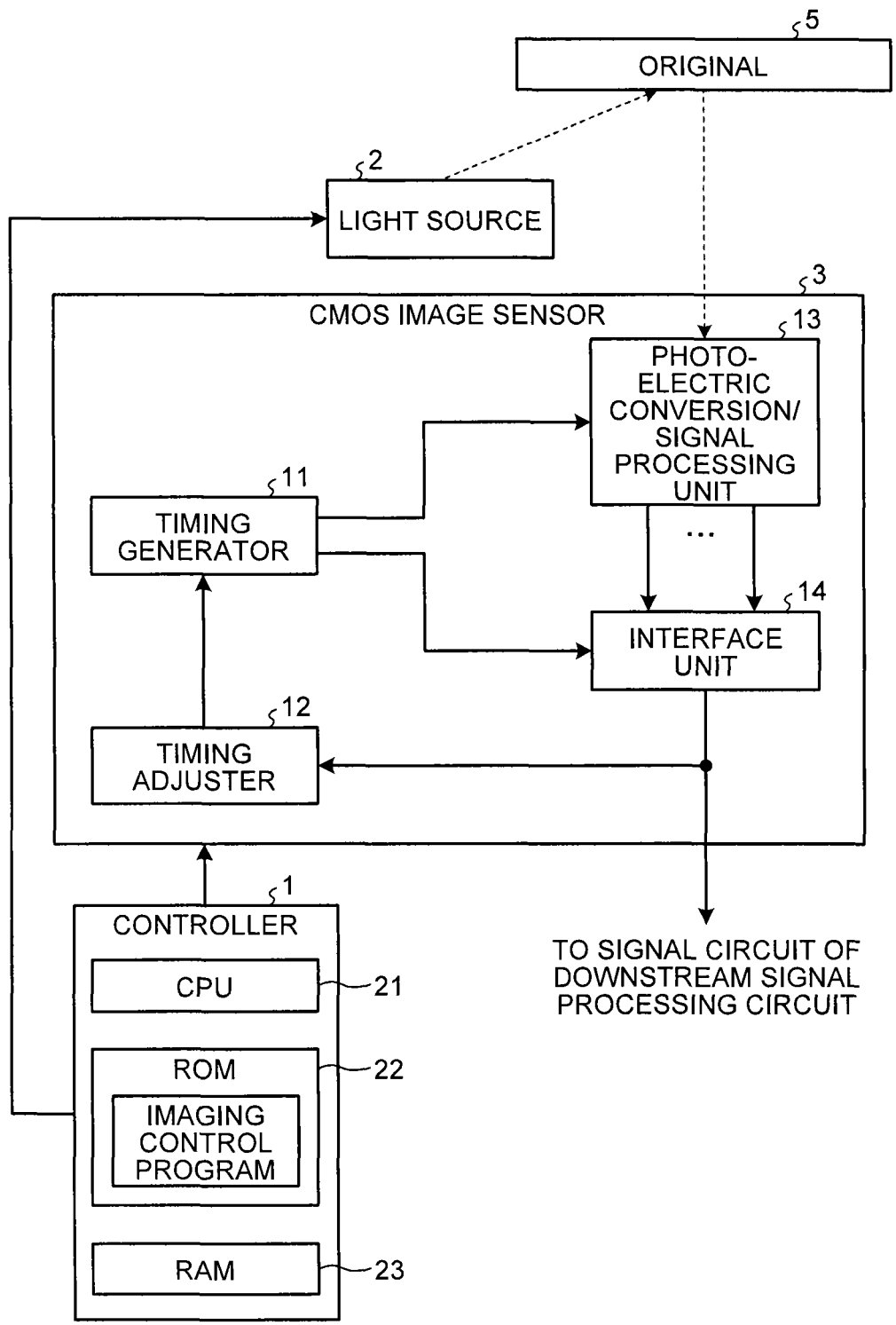
FIG. 3 is a block diagram illustrating an image reading device of a first embodiment of the present invention.

FIG. 3 is a block diagram illustrating the image reading device of the first embodiment. As illustrated in FIG. 3, the image reading device includes a controller 1, a light source 2, and a CMOS image sensor 3. The CMOS image sensor 3 includes a timing generator 11, a timing adjuster 12, a photoelectric conversion/signal processing unit 13, and an interface unit 14. The controller 1, the timing generator 11, and the timing adjuster 12 are an exemplary summation controller. For example, descriptions will be provided for a case where the CMOS image sensor 3 performs summation, which will be described below. Alternatively, summation may be performed by another component other than the CMOS image sensor 3.

The controller 1 totally controls the image reading device. The controller 1 includes a CPU 21, a ROM 22, and a RAM 23. CPU is an abbreviation of "Central Processing Unit". ROM is an abbreviation of "Read Only Memory". RAM is an abbreviation of "Random Access Memory". The ROM 22 stores therein an imaging control program. The CPU 21 performs summation control, which will be described below, according to the imaging control program stored in the ROM 22.

The light source 2 includes a light source, such as an LED, and turns on the light source at the timing when a light ON signal from the controller 1 is asserted. LED is an abbreviation of "Light Emitting Diode".

The timing adjuster 12 of the CMOS image sensor 3 adjusts a timing signal from the timing generator 11 with a control signal from the controller 1 and an adjustment image signal that is input. The timing generator 11 generates timing signals for the photoelectric conversion/signal processing unit 13 and the interface unit 14. Various timings are set according to the control signals from the timing adjuster 12. The photoelectric conversion/signal processing unit 13 includes plural photoelectric conversion elements (pixels) such as photodiodes. The photoelectric conversion/signal processing unit 13 generates imaging signals by performing photoelectric conversion on reflected light from an original 5, which is an exemplary imaging object.

The interface unit 14 of the CMOS image sensor 3 is an exemplary signal generator. The interface unit 14 is an exemplary signal generator. The interface unit 14 generates imaging signals of each line from plural sum outputs that are generated per line, which will be described below, and transfers the imaging signals to the downstream signal processing circuit (not shown). The signal processing circuit performs shading correction for normalizing the imaging signals of the original 5 by using a reference imaging signal that is generated by reading a reference white board. In other words, the signal processing circuit corrects the imaging signals of the original 5 such that the whole image has uniform brightness on average. In this manner, the signal processing circuit corrects variation in sensitivity of the CMOS image sensor 3 and variation in the main-scanning direction, such as variation in distribution of light of the optical system.

Figure 4:
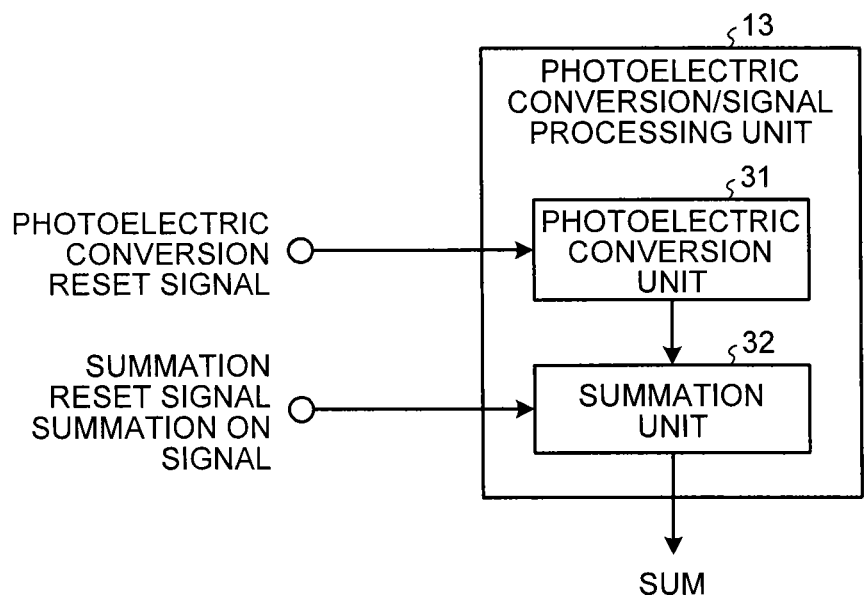
FIG. 4 is a block diagram illustrating a photoelectric conversion/signal processing unit provided to the image reading device of the first embodiment.

FIG. 4 is a block diagram illustrating the photoelectric conversion/signal processing unit 13. As illustrated in FIG. 4, the photoelectric conversion/signal processing unit 13 includes a photoelectric conversion unit 31 and a summation unit 32. A photoelectric conversion reset signal from the timing generator 11 is supplied to the photoelectric conversion unit 31. A summation resetting signal and a summation-ON signal from the timing generator 11 are supplied to the summation unit 32.

The photoelectric conversion unit 31 is a so-called line sensor in which photoelectric conversion elements are arrayed in a row (or in plural rows) in the line direction. The direction in which the photoelectric conversion elements are arrayed is referred to as the "main-scanning direction" and the direction orthogonal to the main-scanning direction is referred to as the "sub-scanning direction". The photoelectric conversion unit 31 performs photoelectric conversion on the reflected light from the original 5 with the photoelectric conversion elements and stores electric charge. The photoelectric conversion unit 31 resets the stored charge when the photoelectric conversion rest signal is asserted. The summation unit 32 holds the signal level and outputs the signal level downstream. When the summation-ON signal is asserted, the summation unit 32 adds the signal that is input from the photoelectric conversion unit 31 to the level that the summation unit 32 holds. The summation unit 32 resets the held level at the timing when the summation rest signal is asserted.

By performing processing in each pixel in parallel in the main scanning direction and outputting a signal of each pixel to the downstream processor, the image of each pixel in the main scanning direction can be read. When a color original 5 is dealt with, it is satisfied if the photoelectric conversion/signal processing units 13 corresponding to colors, such as R (Red), G (Green), and B (Blue), respectively, are provided, which will be described below.

Figure 5:
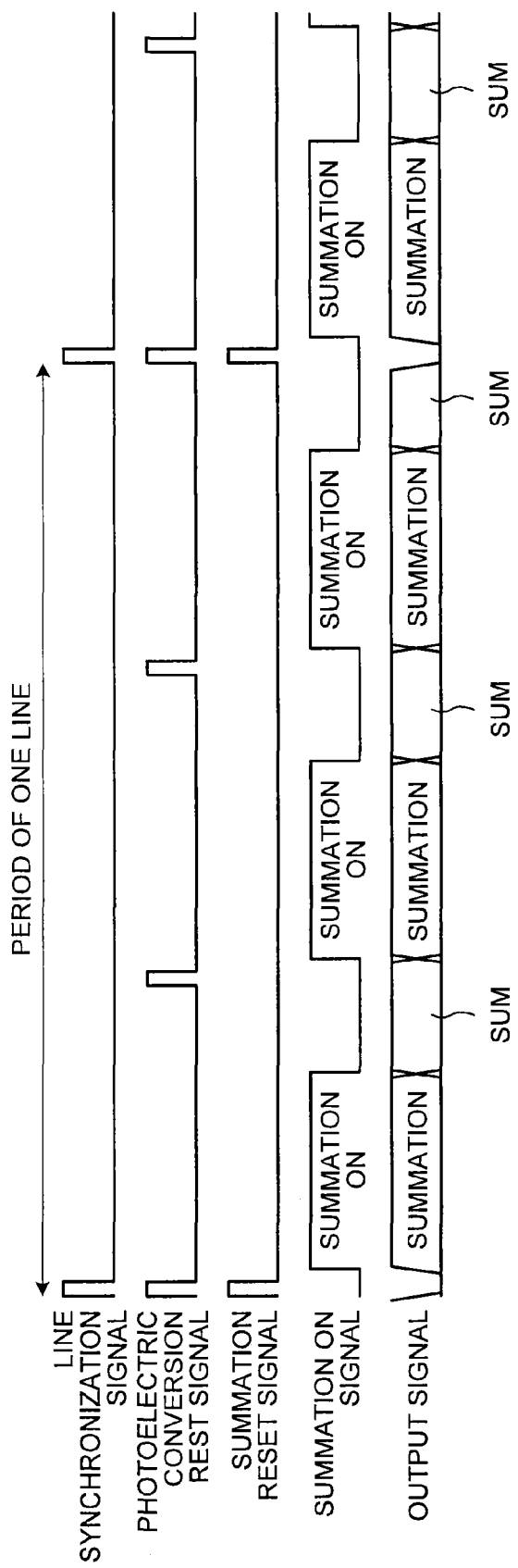
FIG. 5 is a timing chart illustrating an operation of summation of imaging signals in the image reading device of the first embodiment.

FIG. 5 is a timing chart illustrating the photoelectric conversion/signal processing unit 13. The example shown in FIG. 5 is an exemplary case where summation is performed for three times during a period of reading of one line. The controller 1 supplies a read start signal to the timing adjuster 12 at the timing for starting reading the original 5. Upon receiving the read start signal, the timing adjuster 12 generates a line synchronization signal that synchronizes with the period of reading of one line of the photoelectric conversion unit 31.

The controller 1 supplies, to the timing adjuster 12, a signal indicating a read mode that is selected by an operator of the image reading device. The timing adjuster 12 generates a photoelectric conversion reset signal, a summation reset signal, and a summation ON signal such that summation is performed for the number of times corresponding to the reading mode indicated by the controller 1. Specifically, the timing adjuster 12 generates a photoelectric conversion reset signal, a summation reset signal, and a summation ON signal such that summation is performed on the imaging signals acquired in the time period of one line for the number of plural times that corresponds to the reading mode and that is twice as much as that of the spatial frequency of the original 5 or more.

In other words, the manufacturer of the image reading device previously sets plural reading modes for performing summation in periods that are twice as much as that of the spatial frequency of the original 5, serving as a reference where a horizontal line or halftone dots along the main-scanning direction are drawn, or more. The number of times of summation is proportional to the sensitivity of reading the original 5. As the number of times of summation increases, the reading sensitivity increases. For example, for the image reading device of the embodiment, are set a "low sensitivity mode" where summation is performed twice during the period of reading of one line, a "middle sensitivity mode" where summation is performed for three times, a "high sensitivity mode" where summation is performed for five times, and a "ultra-high sensitivity mode" where summation is performed all the time during the period of reading of one line, i.e., the number of times no summation is performed is zero (i.e., the time without summation is 0 second).

Data on the reading modes is stored in the ROM 22. The operator selects a desired reading mode from among the reading modes. The controller 1 sets the reading mode that is selected by the operator for the timing adjuster 12. The timing adjuster 12 generates a photoelectric conversion reset signal, a summation reset signal, and a summation ON signal for timings corresponding to the reading mode.

In this example, plural reading modes corresponding to the reading sensitivity are previously set and the operator selects a desired reading mode. However, before the main reading, i.e., in the preview, the original 5 is roughly read and, from the imaging signals thus acquired, the spatial frequency of the original 5 is detected. For the number of times of summation, the number of plural times that is twice as much as that of the detected spatial frequency of the original 5 or more may be set.

FIG. 5 illustrates an example where the "middle sensitivity mode" where summation is performed for three times is selected. In this case, the controller 1 sets the "middle sensitivity mode" for the timing adjuster 12. The timing adjuster 12 controls the timing generator 11 such that the timing generator 11 generates a photoelectric conversion reset signal that turns to a high level for three times at equal intervals during the period of one line with which summation is performed for the number of times corresponding to the "middle sensitivity mode". The photoelectric conversion reset signal is supplied to the photoelectric conversion unit 31 shown in FIG. 4.

The timing adjuster 12 controls the timing generator 11 such that the timing generator 11 generates a summation reset signal that turns to a high level in the period of one line. The summation rest signal is supplied to the summation unit 32 shown in FIG. 4. The timing adjuster 12 further controls the timing generator 11 such that the timing generator 11 generates a summation ON signal that turns to a high level for a given time after a photoelectric conversion reset signal at a high level is generated until the next photoelectric conversion reset signal at a high level is generated. The summation ON signal is supplied to the summation unit 32 shown in FIG. 4.

The summation unit 32 shown in FIG. 4 performs summation of imaging signals from the photoelectric conversion unit 31 while the summation ON signal at a high-level is being supplied until the photoelectric conversion unit 31 is reset according to the a photoelectric conversion reset signal at a high level as illustrated in FIG. 5. The summation unit 32 supplies the summed imaging signals (sum) to the downstream signal processing circuit at the timing when the ON signal turns to a low level. In this example, because a photoelectric conversion reset signal is supplied to the photoelectric conversion unit 31 for three times for one line, the summation unit 32 repeatedly performs summation of imaging signals and outputs the sum for three times for one line. The summation unit 32 is reset in the period of one line according to the summation reset signal.

Figure 6:
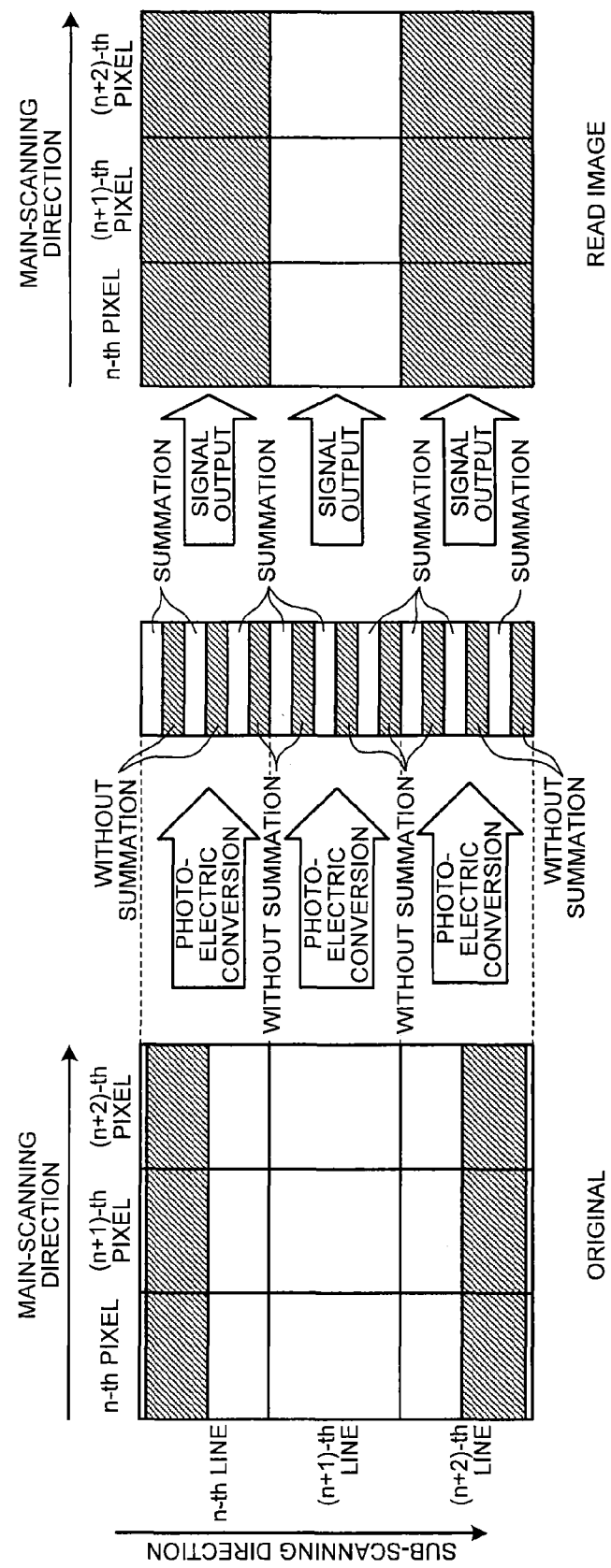
FIG. 6 is a diagram illustrating summation of imaging signals in the image reading device of the first embodiment.

FIG. 6 is a schematic diagram illustrating a reading operation in the "middle sensitivity mode" in the image reading device of the embodiment. FIG. 6 illustrates the reading operation in a case where summation is performed for three times at equal intervals for one line. The left diagram in FIG. 6 illustrates the original 5 where fine lines along the main-scanning direction (horizontal lines) are drawn in an n-th line and a (n+2)-th line (n is a natural number). The central diagram in FIG. 6 illustrates the timings of summation that is performed by the summation unit 32 for three times. The central diagram in FIG. 6 illustrates that the time of "summation" indicates the time during which the summation unit 32 performs summation according to the summation ON signal at a high level. The central diagram in FIG. 6 also illustrates that the time "without summation" indicates the time during which the summation unit 32 outputs the sum at the timing when the summation ON signal at a low level is supplied. The right diagram in FIG. 6 illustrates an image (read image) corresponding to the sum of imaging signals.

The imaging signals corresponding to the fine line drawn in the n-th line shown in the left diagram in FIG. 6 are summed in first and second summation times shown in the central diagram in FIG. 6. Accordingly, the horizontal line in the main-scanning direction drawn in the n-th line appears on the read image as depicted in the right diagram in FIG. 6.

The imaging signals corresponding to the fine line drawn in the (n+2)-th line shown in the left diagram in FIG. 6 are not summed in the first and second summation times shown in the central diagram in FIG. 6 but are summed in a third summation time. Accordingly, the horizontal line in the main-scanning direction drawn in the (n+2)-th line appears in the read image as depicted in the right diagram in FIG. 6.

As is clear from the above descriptions, the image reading device of the first embodiment performs, on imaging signals per line that are obtained by reading the original 5, summation for the number of plural times in periods that are twice as much as that of the spatial frequency of the original 5 or more. This increases the frequency for performing summation, which makes it possible to read the original 5 with high reproducibility. Accordingly, the inconvenience in that an image with a higher spatial frequency in the sub-scanning direction, such as a horizontal line or halftone dots drawn in the main-scanning direction, disappears from the read image can be prevented. Furthermore, when the original 5 on which an image with a high spatial frequency is drawn in the sub-scanning direction is read, the inconvenience in that moire of frequency components that do not originally exist occurs in the sub-scanning direction can be prevented.

When the operator changes the reading mode, the controller 1 accordingly changes the reading mode that is set for the timing adjuster 12. For example, when the controller 1 sets the "high sensitivity mode" where summation is performed for five times, the timing adjuster 12 controls the summation unit 32 such that the summation unit 32 performs summation for five times at equal intervals for one line. This allows reading with much higher sensitivity. The timing adjuster 12 controls the timing generator 11 in this manner so that the number of times of summation in one line and the time required per summation can be changed. With a larger number of times of summation, the original with high spatial frequency can be dealt with. For the number of times of summation, a default that is stored in the timing adjuster 12 may be used.

Second Embodiment

An image reading device of a second embodiment will be described here. The image reading device of the second embodiment is an example where summation of image signals is performed by performing summation of charge that is generated by the photoelectric conversion unit 31, which is the only difference between the first embodiment and the second embodiment to be described below. Thus, only the difference between the first and second embodiments will be described below and the same descriptions will be omitted.

Figure 7:
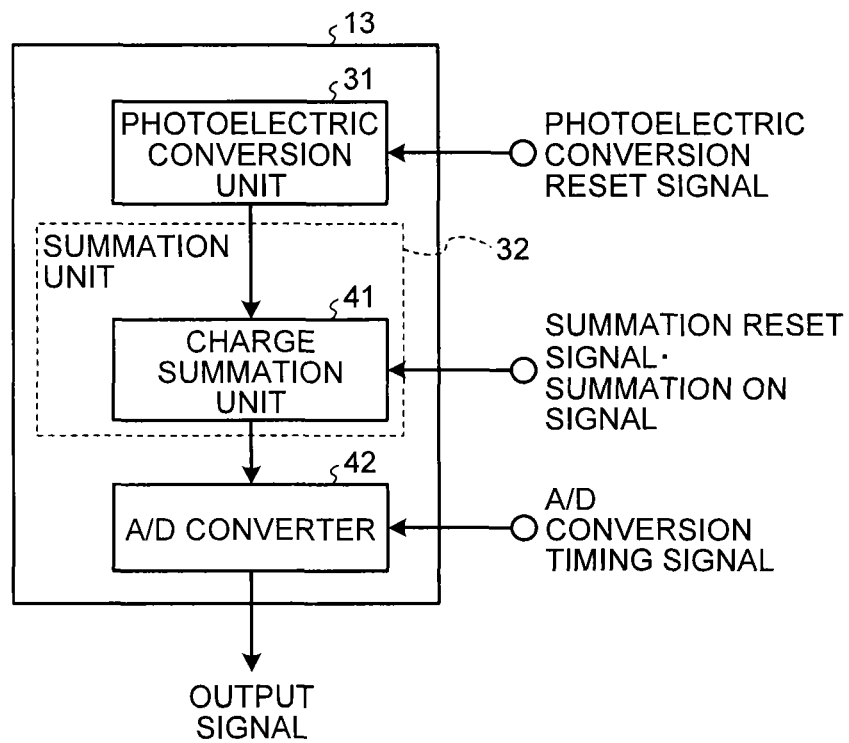
FIG. 7 is a block diagram illustrating a photoelectric conversion/signal processing unit that is provided to an image reading device of a second embodiment.

FIG. 7 is a block diagram of the photoelectric conversion/signal processing unit 13 of the image reading device of the second embodiment. As is known from FIG. 7, the image reading device of the second embodiment includes, for the photoelectric conversion/signal processing unit 13, a charge summation unit 41 applied as the summation unit 32 and an A/D converter 42 in addition to the photoelectric conversion unit 31. The A/D converter 42 is an exemplary analog/digital converter.

In the image reading device of the second embodiment, when the summation ON signal from the timing generator 11 is being asserted, the charge summation unit 41 of the summation unit 32 sums the charge that is generated by the photoelectric conversion unit 31 and the charge held in the charge summation unit 41. When the summation reset signal is asserted, the charge summation unit 41 resets the summed charge. After the summation for one line ends, the A/D converter 42 samples and holds the sum from the charge summation unit 41 according to an A/D conversion timing signal that is supplied via the timing adjuster 12 and the timing generator 11. The A/D converter 42 perform A/D conversion on the sum that is sampled and held and accordingly outputs the summation data (output signal) obtained by digitizing the sum that is an analog signal.

The image reading device of the second embodiment performs summation of charges generated by the photoelectric conversion unit 31, which allows analog summation, prevents inconvenience in that an overhead of the operation time occurs, and furthermore implements the same effect as that of the first embodiment.

Third Embodiment

An image reading device of a third embodiment will be described here. The image reading device of the third embodiment is an example where digital summation of imaging signals generated by the photoelectric conversion unit 31 is performed, which is the only difference between each of the above-described embodiments and the third embodiment to be described below. Thus, only the difference will be described below and the same descriptions will be omitted.

Figure 8:
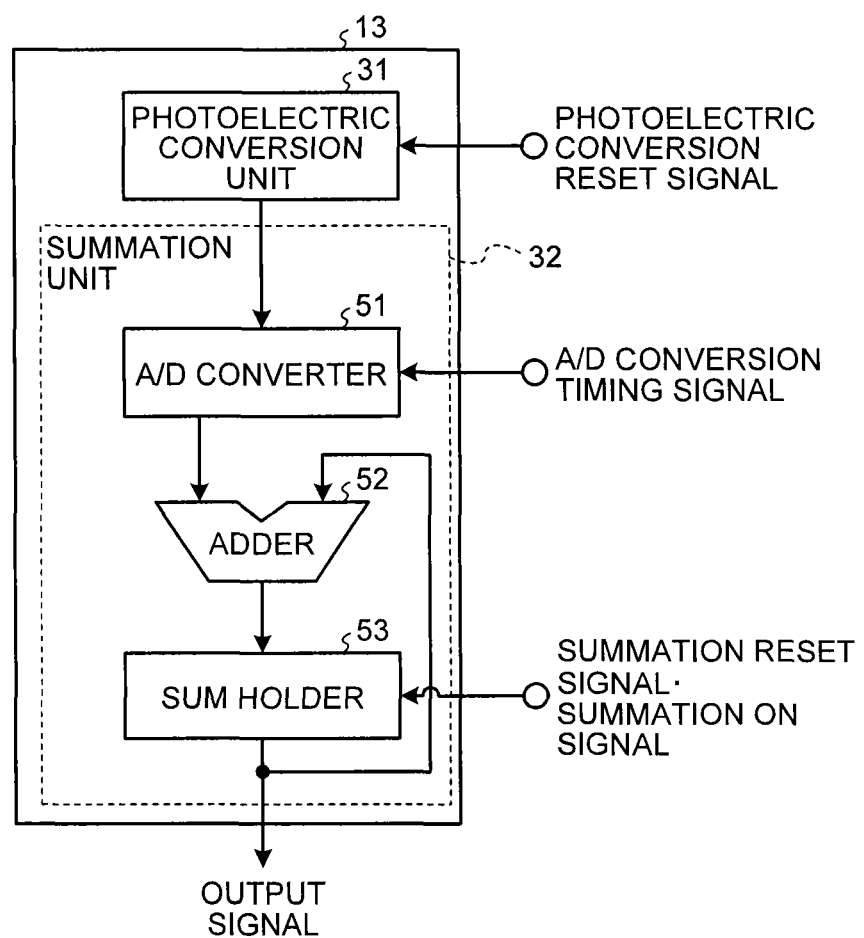
FIG. 8 is a block diagram illustrating a photoelectric conversion/signal processing unit that is provided to an image reading device of a third embodiment.

FIG. 8 is a block diagram illustrating the photoelectric conversion/signal processing unit 13 of the image reading device of the third embodiment. As is known from FIG. 8, the image reading device of the third embodiment includes, for the photoelectric conversion/signal processing unit 13, an A/D converter 51, an adder 52, and a sum holder 53 that are provided as the summation unit 32, in addition to the photoelectric conversion unit 31.

Figure 9:
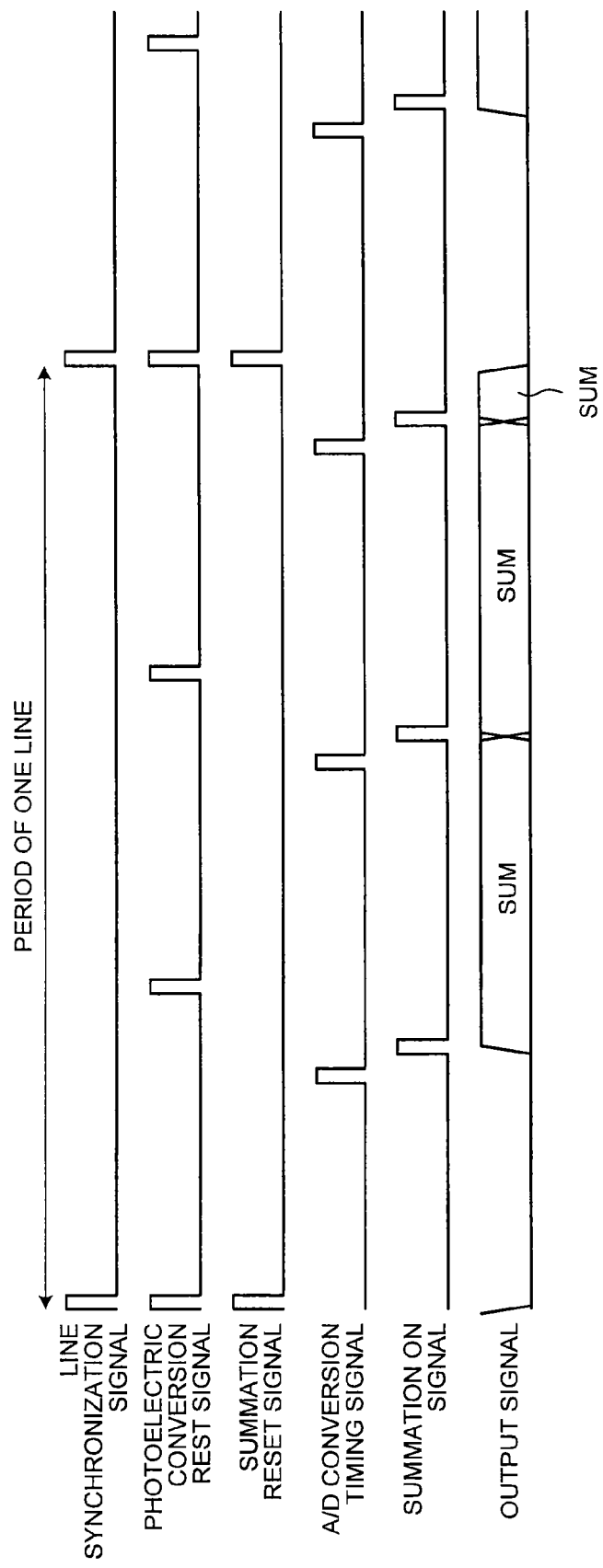
FIG. 9 is a timing chart illustrating a digital operation of summation of imaging signals in the image reading device of the third embodiment.

In the image reading device of the third embodiment, the A/D converter 51 of the summation unit 32 samples and holds an imaging signal from the photoelectric conversion unit 31 at the timing of the A/D conversion timing signal shown in FIG. 9 from the timing generator 11 and performs A/D conversion on the signal. Accordingly, the A/D converter 51 generates imaging data and supplies the imaging data to the adder 52. By adjusting the timing of A/D conversion, the image reading sensitivity can be adjusted. The details will be given below. The adder 52 adds the imaging data from the A/D converter 51 to the imaging data that is held by the sum holder 53 and supplies the addition imaging data resulting from the addition to the sum holder 53.

The sum holder 53 updates the old addition imaging data that the sum holder 53 holds to new addition imaging data that is supplied from the adder 52 at the timing when the summation ON signal is asserted in one line in which adjacent summation reset signals shown in FIG. 9 are supplied. At the timing when the summation ON signal is asserted, the sum holder 53 outputs the addition imaging data, which is updated at the timing when the summation ON signal is asserted, as summation data (output signal).

An increase in the number of times of summation during the one-line time period naturally shortens the time per summation, which lowers the signal level per A/D conversion. Accordingly, the number of quantization bits required for A/D conversion is reduced. Thus, the controller 1 controls the A/D converter 51 to change the quantization bits of A/D conversion (quantization accuracy) according to the number of times of summation during one-line time period.

Specifically, when the number of times of summation during the one-line time period is large, the controller 1 controls the A/D converter 51 to reduce the number of quantization bits for A/D conversion. When the number of times of summation during the one-line time period is small, the controller 1 controls the A/D converter 51 to increase the number of quantization bits of A/D conversion. Accordingly, the time for A/D conversion can be reduced.

As is clear from the above description, the image reading device of the third embodiment performs digital summation of imaging signals that are generated by the photoelectric conversion unit 31. Digital summation allows accurate operation (summation). Furthermore, by changing the number of quantization bits of A/D conversion according to the number of times of summation during the one-line time period, the time required for A/D conversion can be shortened and, furthermore, the same effect as that of each of the above-described embodiments can be implemented.

Fourth Embodiment

An image reading device of a fourth embodiment will be described here. The image reading device of each of the above-described embodiments determines the sensitivity in reading the original 5 according to the number of times of summation corresponding to the reading mode. The image reading device of the fourth embodiment changes the reading sensitivity by changing the summation time in each summation, which is the only difference between each of the above-described embodiments and the fourth embodiment. Thus, only the difference will be described below and the same descriptions will be omitted.

In the fourth embodiment, the controller 1 sets, for the timing adjuster 12, a predetermined summation time that is stored as a default in the timing adjuster 12, etc. Alternatively, the controller 1 sets, for the timing adjuster 12, the summation time for each of the above-described reading modes that is stored in the memory area of the controller 1.

When adjusting the summation time, the controller 1 moves the carriage to a position where the reference white board (denoted by the reference numeral 110 in FIG. 11) that is provided to the image reading device, which will be described below, and instructs the timing adjuster 12 to start adjustment. An imaging signal at a reference output level (reference imaging signal) that is generated by reading the reference white board is supplied to the timing adjuster 12. The timing adjuster 12 adjusts the summation time such that the reference imaging signal is adjusted to the target level that is set by the controller 1. In other words, the timing adjuster 12 uses the imaging signal at the reference output level, which is generated by reading the reference white board, to adjust the time required per summation to a summation time with which imaging signals each with uniform luminance are generated over the photoelectric conversion unit 31. By performing such adjustment on summation time with the reference white board when the main power supply of the image reading device is turned on, optimum adjustment can be made on summation time without any effect of aging degradation of the light source 2 and optical-system components.

Figure 10:
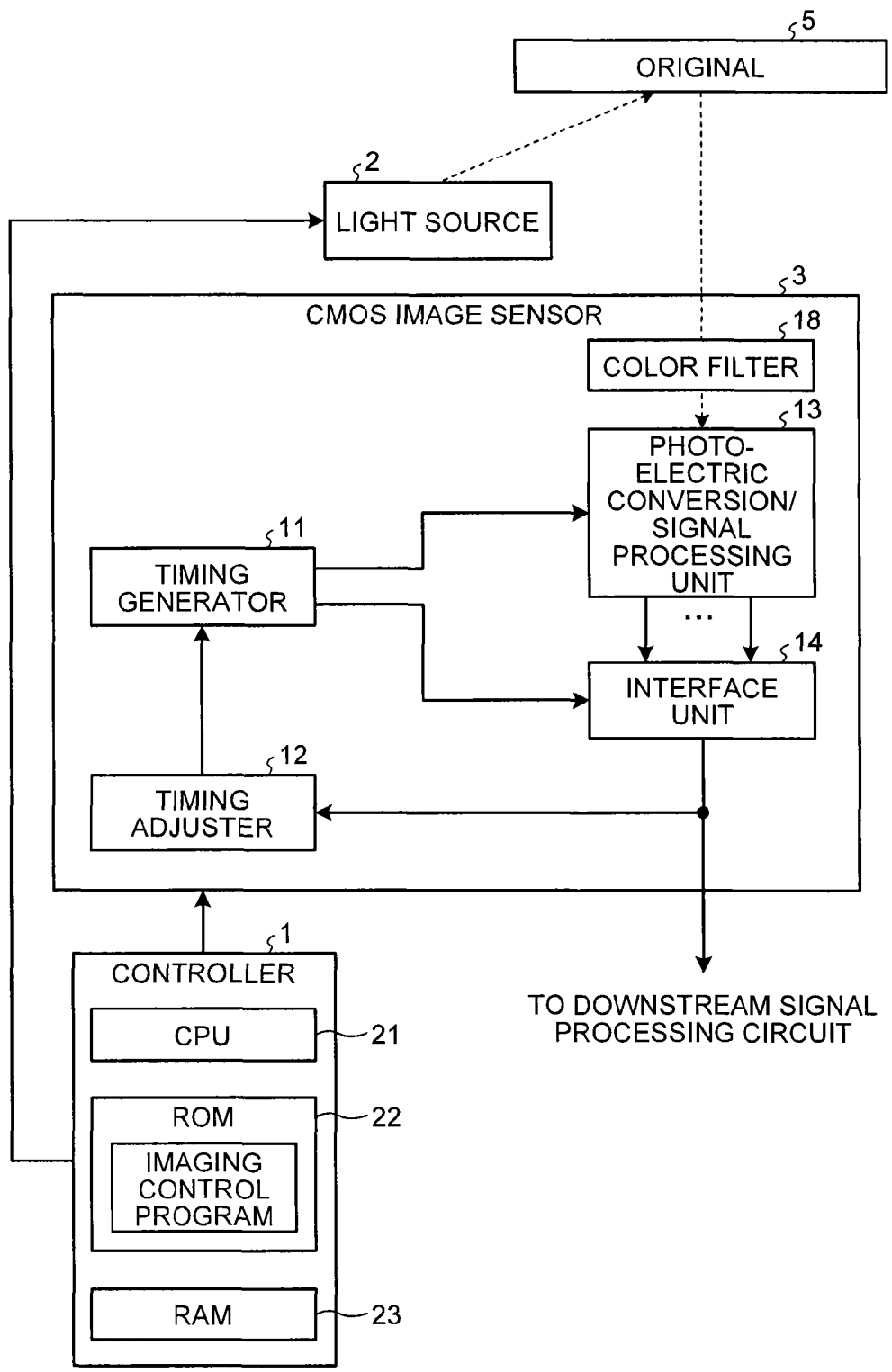
FIG. 10 is a block diagram illustrating an image reading device of a fourth embodiment.

When the color original 5 is read, as illustrated in FIG. 10, a color filter 18 that includes an imaging light generators for the respective colors of red (R), green (G), and blue (B) is provided before the photoelectric conversion/signal processing unit 13. The imaging light of each of the colors via the color filter 18 is received by a corresponding photoelectric conversion element of the photoelectric conversion/signal processing unit 13 and photoelectric conversion is performed. In this case, the photoelectric conversion/signal processing unit 13 is provided for each of the colors. The controller 1 controls the timing adjuster 12 to adjust the summation time for each color. Accordingly, the reading sensitivity can be adjusted per color.

When the summation time is changed for each of the above-described reading modes, the controller 1 holds the result of adjusting the summation time for each of the reading modes and switches the summation time according to an instruction from the controller.

The controller 1 controls and changes the summation time according to the sensitivity of the photoelectric conversion elements. Specifically, the controller 1 controls the timing adjuster 12 to adjust the summation time to a longer time if the sensitivity of the photoelectric conversion element is low and to a shorter time if the sensitivity of the photoelectric conversion element is high. Accordingly, the sum output at a constant level can be obtained regardless of the sensitivity of the photoelectric conversion element.

As is clear from the above descriptions, the image reading device of the fourth embodiment adjusts the reading sensitivity by adjusting the summation time. Accordingly, the same effect as that of each of the above-described embodiments can be implemented.

Fifth Embodiment

Figure 11:
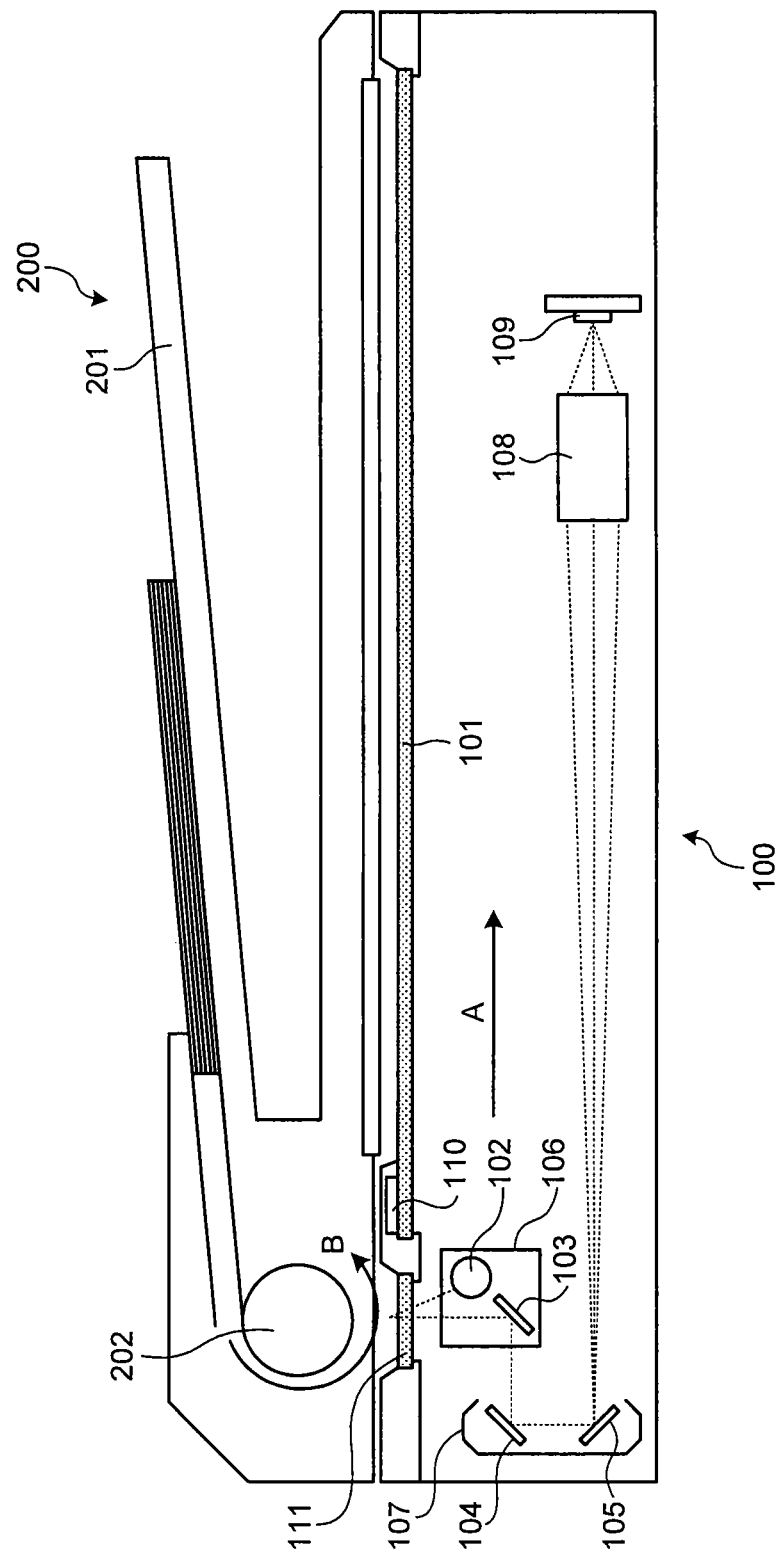
FIG. 11 is a cross-sectional view of a main part of an image reading device of a fifth embodiment.

An image reading device of a fifth embodiment to which any one of the first to fourth embodiments is applied will be described here. FIG. 11 is a schematic cross-sectional view illustrating an exemplary configuration example of the mechanical components of the image reading device of the fifth embodiment. An image reading device 100 shown in FIG. 11 is a scanner device that is provided to an image forming apparatus, such as a digital copier, a digital multi-function peripheral, or a facsimile device, or a stand-alone scanner device.

The image reading device 100 includes a exposure glass 101 with the top surface on which an original is put. The image reading device 100 further includes: a first carriage 106 including a light source 102 (the light source 2) for exposing an original and a first reflection mirror 103; and a second carriage 107 including a second reflection mirror 104 and a third reflection mirror 105.

The image reading device 100 includes a lens unit 108 for forming an image of light that is reflected by the third reflection mirror 105 on a light receiving area (imaging element) of an imaging device 109. The image reading device 100 further includes: the reference white board 110 with a reference density, such as a reference white board for correcting various types of distortion caused by a reading optical system, etc.; and a sheet through reading slit 111.

The reference white board 110 can be illuminated by the light source 102 and the reference white board 110 is provided in a position different from those of the exposure glass 101 where an original is illuminated and the sheet through reading slit 111. The light reflected from any of the original put on the exposure glass 101, the original that passes through the sheet through reading slit 111, and the reference white board 110 can be incident on the imaging device 109.

An automatic document feeder (ADF) 200 serving as an automatic original feeding unit is provided above the image reading device 100 and the ADF 200 and the image reading device 100 are connected with hinges (not shown), etc., such that the ADF 200 can be opened and closed with respect to the exposure glass 101. The ADF 200 includes an original tray 201 serving as an original table on which a bundle of originals can be put. The ADF 200 further includes a separation and feeding unit that includes a feeding roller 202 that separates the originals put on the original tray 201 one by one and automatically feeds the original to the sheet through reading slit 111.

A description will be provided here for the operation of the image reading device 100 with such a configuration in a scan mode for reading the image of an original put on the exposure glass 101 by scanning the image surface of the original. In the scan mode, a stepping motor (not shown) causes the first carriage 106 and the second carriage 107 to move in the direction denoted by the arrow A (in the sub-scanning direction) and to scan an original. In order to keep constant the optical path length from the exposure glass 101 to the light receiving area (the imaging element) of the imaging device 109, the second carriage 107 moves at a half speed of that of the first carriage 106.

The image surface that is the bottom surface of the original that is set on the exposure glass 101 is illuminated (exposed) with the light source 102 of the first carriage 106. The reflected light from the image surface is sequentially reflected by the first reflection mirror 103 of the first carriage 106 and second and third reflection mirrors 104 and 105 of the second carriage 107. The reflected luminous flux from the third reflection mirror 105 is focused with the lens unit 108 and an image is formed on the light receiving area (the photoelectric conversion unit 31) of the imaging device 109.

The imaging device 109 generates an analog imaging signal obtained by performing, with the photoelectric conversion unit 31, photoelectric conversion on the amount of light received per pixel (per photoelectric conversion element) per line. The imaging signal is converted into a digital signal via each unit of the imaging device 109, is amplified with the adjusted gain, and then is output as imaging data corresponding to the read original.

A description will be provided here for an operation in a sheet through mode where the ADF 200 automatically feeds an original and the moving original is read. In the sheet through mode, the first carriage 106 and the second carriage 107 move to the lower side with respect to the sheet through reading slot 111 and stop. The bundle of originals put on the original tray 201 are automatically fed from the bottom one by the feeding roller 202 in the direction denoted by the arrow B (in the sub-scanning direction) and the original is scanned when passing through the position of the sheet through reading slit 111.

The bottom surface (the image surface) of the original that is automatically fed is illuminated by the light source 102 of the first carriage 106. The reflection light from the image surface is then sequentially reflected by the first reflection mirror 103 of the first carriage 106 and the second and third reflection mirrors 104 and 105 of the second carriage 107. The reflected luminous flux from the third reflection mirror 105 is then focused by the lens unit 108 and an image is formed on the imaging device 109.

The imaging device 109 outputs an analog imaging signal obtained, with the photoelectric conversion element of the light receiving area, by performing photoelectric conversion on the amount of light received per pixel per line. The imaging signal is converted into a digital signal by each unit of the imaging device 109, is amplified with the adjusted gain, and is output as imaging data corresponding to the read original. The original that has been read is ejected to an ejection port (not shown).

Before the image reading in the scanning mode or the sheet through mode, the imaging device 109 reads the image from the reflection light from the reference white board 110 that is illuminated by the light source 102 that is turned on. In order to keep the level of each pixel of the image data of one line at a given constant level, the imaging device 109 generates and stores shading correction data. Thereafter, when an original is read, according to the pre-stored shading correction data, shading correction is performed on the image data that is generated by the imaging device 109.

The image reading device of the fifth embodiment can prevent inconvenience in that moire occurs in the sub-scanning direction even when an original is read on which a horizontal line or halftone dots with high spatial frequency in the sub-scanning direction are drawn. Accordingly, the image reading device of the fifth embodiment can increase the quality of a read image and implement the same effect as that of each of the above-described embodiments.

Sixth Embodiment

Figure 12:
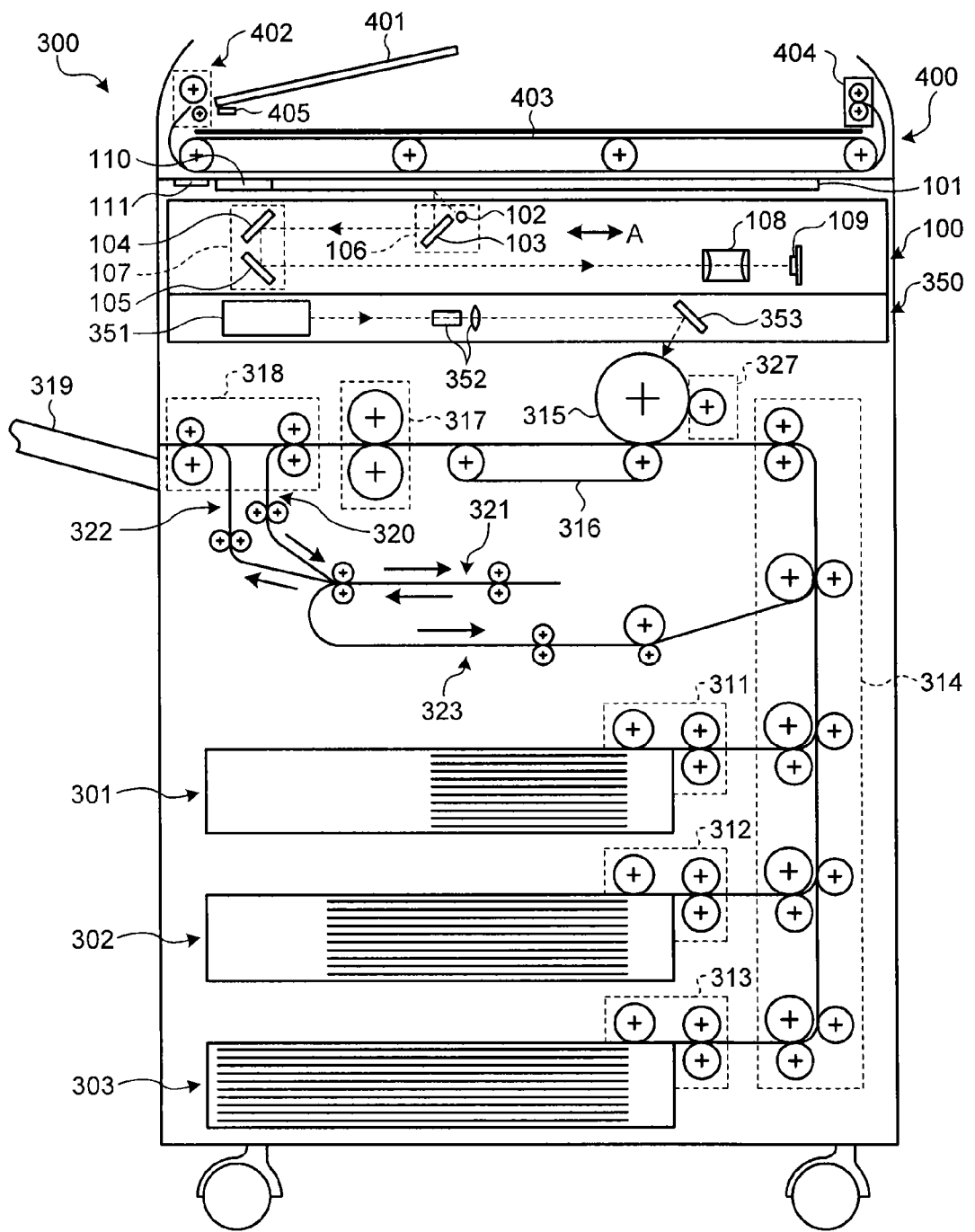
FIG. 12 is a cross-sectional view of an image forming apparatus of a sixth embodiment.

An image forming apparatus of a sixth embodiment to which the image reading device of the fifth embodiment is applied will be described here. FIG. 12 is a schematic cross-sectional view illustrating an exemplary configuration of the mechanical components of the image forming apparatus of the sixth embodiment.

An image forming apparatus 300 includes the image reading device 100 described for the fifth embodiment. The same components in FIG. 12 as those in FIG. 11 are denoted by the same reference numerals as those in FIG. 11. An auto document feeder (ADF) 400 provided above the image reading device 100 is different in some way from the ADF 200 illustrated in FIG. 11.

The image forming apparatus 300 is a digital copier including the image reading device 100. The ADF 400 is provided above the exposure glass 101 of the image reading device 100 on which an originals is put. The ADF 400 and the image reading device 100 are connected with hinges, etc., such that the ADF 400 can be opened and closed with respect to the exposure glass 101.

The ADF 400 includes an original tray 401 that serves as an original table on which a bundle of originals can be put. In response to pushing of a print key on an operation unit (not shown), the ADF 400 separates the originals, which are put with their image surfaces facing up on the original tray, one by one and feeds the original automatically. In order to covey the original to the sheet through reading slit 111 or the exposure glass 101, the ADF 400 includes a separation and feeding unit including a feeding roller 402 and a conveyance belt 403. After the image on the original that is fed by the feeding roller 402 or the conveyance belt 403 is read, the original is ejected by the ejection roller 404 to the top surface of the ADF 400.

A description will be given here for an operation of a controller (not shown) and the ADF 400 performed to convey, with the ADF 400, the original to the reading position on the exposure glass 101. The feeding motor of the ADF 400 is driven according to an output signal from the controller. When a feeding start signal that is generated in response to the pushing of the print key on the operation unit is input, the controller drives the feeding motor in regular and reverse directions.

When the feeding motor is driven in the regular direction, the feeding roller 402 rotates clockwise to automatically feed the top original of the bundle of originals on the original tray 401 and convey the original to the sheet through reading slit 111 or the exposure glass 101. When the back end of the original is detected by an original setting detection sensor 405, the controller drives the feeding motor in the reverse direction according to an output signal from the original setting detection sensor 405. This prevents the subsequent original from entering.

When the original setting detection sensor 405 detects the back end of the original, the controller counts rotation pulses of a conveyance belt motor (not shown) after the detection and, when the rotation pulses reach a given value, stops driving the conveyance belt 403. Stopping the conveyance belt 403 causes the original to stop at the reading position on the exposure glass 101.

At the time when the original setting detection sensor 405 detects the back end of the original, the controller drives the feeding motor in the regular direction again to separate the subsequent original as described above and automatically feed the original. The controller then conveys the original to the exposure glass 101 and, when pulses of the feeding motor after the detection of the original by the original setting detection sensor 405 reaches the given value, stops driving the feeding motor so as to stand by the original with its tip put forward.

When the original stops at the reading position on the exposure glass 101, the image on the original is read. When the image reading ends, a signal indicating the fact is input to the controller and, in response to the signal, the controller drives the conveyance belt motor in the regular direction to convey, with the conveyance belt 403, the original from the exposure glass 101 to an ejection roller 404.

The bundle of originals put with their image surfaces facing up on the original tray 401 of the ADF 400 is automatically fed from the top one in response to pushing of the print key and conveyed with its image surface facing down to the reading position on the exposure glass 101. The original that is conveyed to the reading position and stops is, after the image is read, ejected by the conveyance belt 403 etc. from the ejection port. When it is detected that the next original is on the original tray 401, the next original is automatically fed and conveyed to the exposure glass 101 as the previous original is fed and conveyed.

On the other hand, a first tray 301, a second tray 302, and a third tray 303 that are paper feeding trays that are provided in a lower part of the image forming apparatus 300. Sheets of transfer paper (recording media) are fed by a first paper feeding unit 311, a second paper feeding unit 312, and a third paper feeding unit 313. The sheet of transfer paper is conveyed by a vertical conveyance unit 314 to a position where the transfer paper makes contact with a drum-shaped photosensitive element (photosensitive drum) 315 that is an image carrier. Practically, any one of the trays 301 to 303 is selected and transfer paper is fed from the selected tray. Recording media other than transfer paper may be used.

Image data that is read by the image reading device 100 is temporarily stored in an image memory (not shown). The laser light that is generated by a writing unit 350 is modulated with the image data and the surface of the photosensitive element 315 that is previously charged by a charging unit (not shown) is exposed to the laser light to form an electrostatic latent image corresponding to the image data. The surface of the photosensitive element 315 on which the electrostatic latent image is formed passes through a developing unit 327 so that a toner image that is developed with toner is formed.

The toner image on the photosensitive element 315 is transferred to the transfer paper fed from the selected paper feeding tray, which is a recording medium, while the transfer paper is being conveyed by a conveyance belt 316 at the same speed as that of the rotation of the photosensitive element 315. The transfer paper is conveyed to a fixing unit 317 and, after the toner image is fixed, is ejected by a paper ejection unit 318 to an ejected-paper tray 319 outside the apparatus.

The functions of the paper ejection unit 318 will be described here. For example, to invert a sheet of transfer paper with a toner image on its one surface for face-down ejection (where the image surfaces are made face down in order to arrange the sheets of transfer paper according to the page sequence), the sheet of transfer paper on which an image is formed is conveyed by the paper ejection unit 318 to a duplex printing conveyance route 320. After the switch back inversion by the inversion unit 321, the sheet of transfer paper is ejected to the ejected-paper tray 319 via an inverted paper conveyance route 322. To form images on both surfaces of a sheet of transfer paper, the sheet of transfer paper with an image on its one surface is conveyed by the paper ejection unit 318 to the duplex printing conveyance route 320 and, after switch back inversion by the inversion unit 321, the sheet of transfer paper is sent to a duplex-printing conveyance unit 323.

In order to transfer a toner image that is formed on the photosensitive element 315, the sheet of transfer paper sent to the duplex-printing conveyance unit 323 is fed again from the duplex-printing conveyance unit 323 and is conveyed again by the vertical conveyance unit 314 to the position where the sheet of transfer paper makes contact with the photosensitive element 315. After the toner image is transferred to the other side, the toner image is fixed by the fixing unit 317 and the sheet of transfer paper is ejected by the paper ejection unit 318 to the ejected-paper tray 319.

The photosensitive element 315, the conveyance belt 316, the fixing unit 317, the paper ejection unit 318, and the developing unit 327 are driven by a main motor (not shown) and each of the paper feeding units 311 to 313 is driven with the drive force of the main motor that is transmitted by each feeding clutch. The vertical conveyance unit 314 is driven with the drive force of the main motor that is transmitted via an intermediate clutch.

The writing unit 350 includes a laser output unit 351, an imaging lens 352, and a mirror 353. The laser output unit 351 includes a laser diode that is a laser light source and a polygon mirror or an oscillating mirror with which laser scanning is performed. The laser light emitted by the laser output unit 351 is deflected by the polygon mirror or oscillating mirror, passes through the imaging lens 352, is reflected on the mirror 353, and is focused to form an image on the surface of the photosensitive element 315.

The image forming apparatus (digital copier) of the sixth embodiment forms, on a recording medium, an image corresponding to the image data of an original that is read by the image reading device described for the fifth embodiment. Accordingly, an inconvenience can be prevented in that moire occurs in the sub-scanning direction on the formed image of an original on which a horizontal line or halftone dots with high spatial frequency in the sub-scanning direction are drawn. Thus, the image forming apparatus of the sixth embodiment can increase the quality of the formed image. Furthermore, the same effect as that of each of the above-described embodiments can be implemented.

The embodiment leads to an effect that an original can be read with high reproducibility.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
    an image sensor that generates imaging signals corresponding to imaging light received from an imaging object;
    summation circuitry configured to perform summation of the imaging signals generated by the image sensor;
    summation controller circuitry that controls the summation circuitry such that the summation circuitry performs, per line, an operation of summation of imaging signals acquired from the image sensor during a time period of one line for a number of plural times in periods that are twice as much as that of the spatial frequency of the imaging object or more; and
    a signal generator that generates and outputs an imaging signal of each line from plural sum outputs generated per line,
    wherein the summation controller circuitry generates a photoelectric conversion reset signal and a summation ON signal so that the summation is performed on the imaging signals acquired in the time period of one line for the number of plural times, and supplies, to the summation circuitry, the summation ON signal so as to be synchronized with the photoelectric conversion reset signal while supplying the photoelectric conversion reset signal to the image sensor.

2. The imaging device according to claim 1, wherein the summation controller circuitry controls the summation circuitry such that the summation circuitry performs summation for the number of plural times at equal intervals.

3. The imaging device according to claim 1, further comprising an analog/digital converter that generates imaging data by digitizing the imaging signals from the image sensor,
    wherein the summation circuitry performs summation of the digital imaging data.

4. The imaging device according to claim 3, further comprising quantization control circuitry that changes the quantization accuracy of the analog/digital converter according to the number of times of summation that is controlled by the summation controller circuitry.

5. The imaging device according to claim 1, wherein the summation controller circuitry controls the summation circuitry such that the time required per summation is a summation time that corresponds to the sensitivity of the image sensor.

6. The imaging device according to claim 1, wherein the summation controller circuitry controls the summation circuitry, with an imaging signal at a reference output level that is generated by reading a reference white board, such that the time required per summation is a summation time with which imaging signals each with uniform luminance are generated over the image sensor.

7. The imaging device according to claim 1, wherein
the image sensor includes plural pixels that generate imaging signals corresponding to imaging light and further includes a color filter that includes plural imaging light generators that generate imaging light of each of red, green, and blue from the imaging light and illuminates each of the pixels with the imaging light, and the summation controller circuitry controls the summation circuitry such that the time required per summation is a summation time per color.

8. An image reading device comprising the imaging device according to claim 1.

9. An image forming apparatus comprising the imaging device according to claim 1.

10. A method of driving an imaging device including an image sensor, summation circuitry, summation controller circuitry, and a signal generator, the method of driving the imaging device comprising:

generating, by the image sensor, imaging signals corresponding to imaging light received from an imaging object;

performing, by the summation circuitry, summation of the imaging signals generated by the image sensor;

controlling, by the summation controller circuitry, the summation circuitry such that the summation circuitry performs, per line, an operation of summation of imaging signals acquired from the image sensor during a time period of one line for a number of plural times in periods that are twice as much as that of the spatial frequency of the imaging object or more;

generating and outputting, by the signal generator, an imaging signal of each line from plural sum outputs that are generated per line;

generating, by the summation controller circuitry, a photoelectric conversion reset signal and a summation ON signal so that the summation is performed on the imaging signals acquired in the time period of one line for the number of plural times; and supplying, to the summation circuitry, the summation ON signal so as to be synchronized with the photoelectric conversion reset signal while supplying the photoelectric conversion reset signal to the image sensor.

* * * * *